United States Patent [19]
van Capelleveen

[11] Patent Number: 5,971,456
[45] Date of Patent: Oct. 26, 1999

[54] BAKERY SYSTEM WITH GRIPPER ASSEMBLIES

[75] Inventor: Pieter van Capelleveen, Elst, Netherlands

[73] Assignee: Conway Exploitatie en Beheer, B.V., Netherlands

[21] Appl. No.: 08/831,167

[22] Filed: Apr. 1, 1997

Related U.S. Application Data

[60] Provisional application No. 60/014,702, Apr. 1, 1996.

[51] Int. Cl.[6] .................................. B25J 15/08; B66C 1/42
[52] U.S. Cl. ......................... 294/88; 294/106; 294/119.1; 414/796.9
[58] Field of Search ............................ 294/88, 104, 106, 294/119.1, 67.31, 67.33, 81.51, 81.54, 81.61, 81.62, 907, 902; 414/740, 741, 744.8, 753, 796.9

[56] References Cited

U.S. PATENT DOCUMENTS

| | | | |
|---|---|---|---|
| 4,256,429 | 3/1981 | Dwyer | 294/119.1 |
| 4,305,692 | 12/1981 | Brauer | 294/119.1 |
| 4,453,873 | 6/1984 | Curti | 414/796.9 |
| 4,616,971 | 10/1986 | Matrone | 294/88 |
| 4,673,325 | 6/1987 | Jago | 294/88 |
| 4,815,781 | 3/1989 | No et al. | 294/88 |
| 5,082,319 | 1/1992 | Hurliman et al. | 294/907 |
| 5,391,050 | 2/1995 | Gatteschi | 414/796.9 |
| 5,425,565 | 6/1995 | Rogovein et al. | 294/119.1 |

FOREIGN PATENT DOCUMENTS 3312-483  10/1984  Germany  ........................... 294/119.1

*Primary Examiner*—Dean Kramer
*Attorney, Agent, or Firm*—Carmen Santa Maria

[57] ABSTRACT

A gripper assembly of the invention for a baking pan stacking and unstacking device includes a pick-up bar and at least one holding assembly carried on the pick-up bar. In one embodiment of the invention, the gripper assembly includes a first holding assembly having a first finger element pivotally mounted on the pick-up bar. A second holding assembly is provided having a second finger element pivotally mounted on the pick-up bar. A mechanical linkage is pivotally connected to the first and second finger elements such that pivotal movement of the first finger element causes pivotal movement of the second finger element. In another embodiment of the inventions the gripper assembly includes one pivotal holding assembly and one reciprocally movable holding assembly.

9 Claims, 13 Drawing Sheets

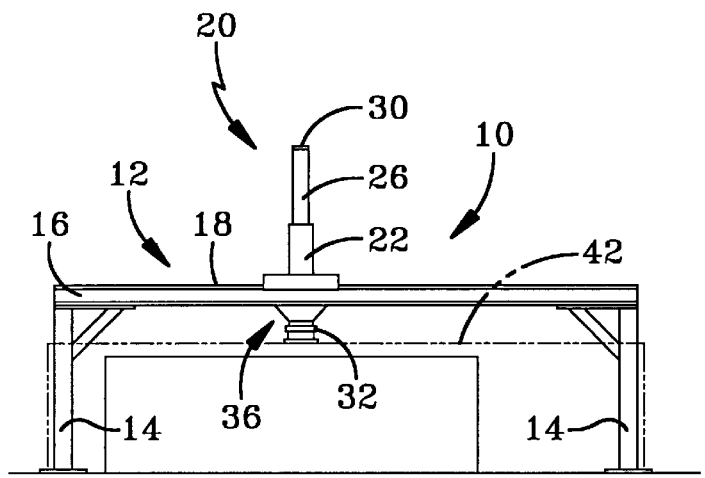
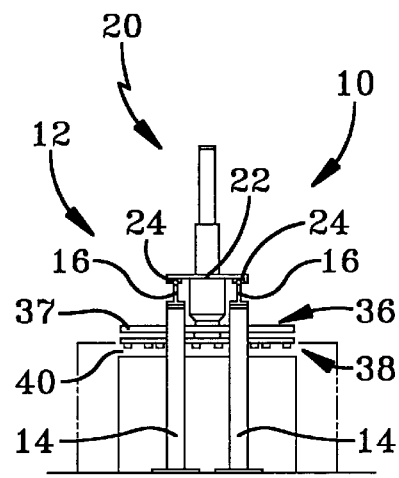
FIG-1
FIG-2
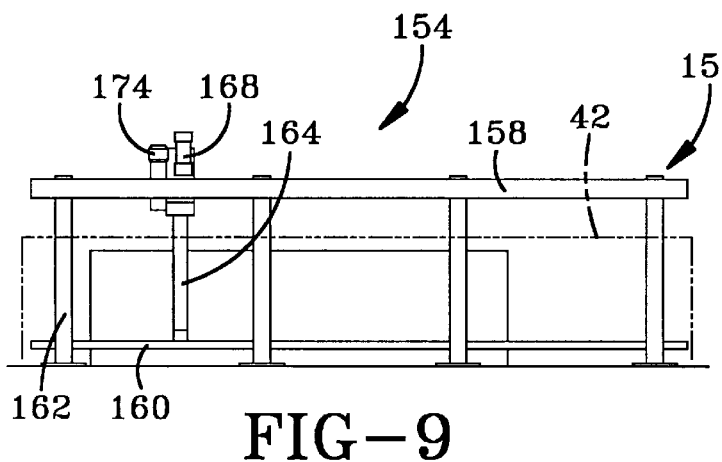
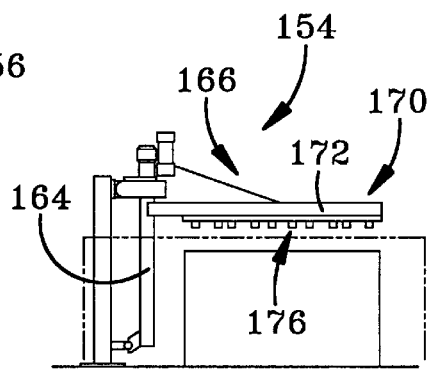
FIG-9
FIG-10
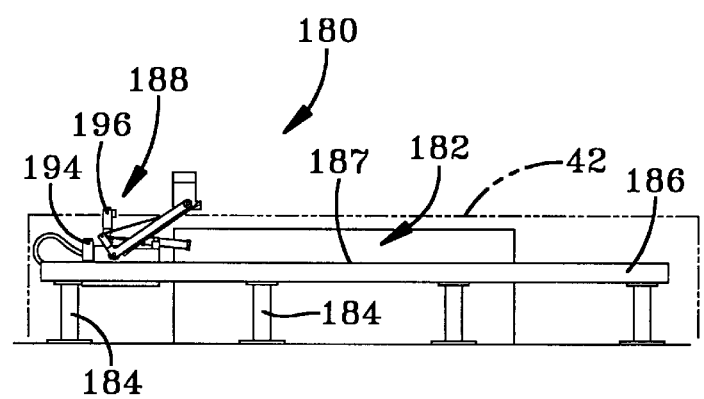
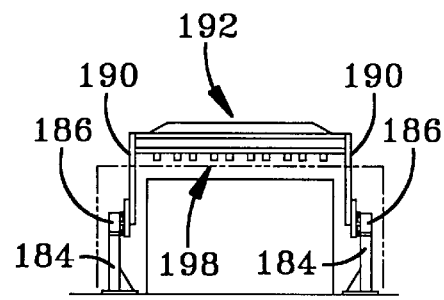
FIG-11
FIG-12

5,971,456

BAKERY SYSTEM WITH GRIPPER ASSEMBLIES

CROSS REFERENCE TO RELATED APPLICATION

This application claims the benefit of Provisional Application Ser. No. 60/014,702 filed on Apr. 1, 1996.

BACKGROUND OF THE INVENTION

1. Field of the Invention

This invention relates generally to stacking and unstacking devices and, more particularly, to a device for stacking and unstacking baking pans using a gripper assembly.

2. Description of the Prior Art

In the baking industry, empty baking pans are generally stored in single stacks on movable pan trucks or at designated locations on the floor of the bakery. The baking pans are typically rectangular and have a number of individual baking forms located in the pan. A stacker machine stacks the pans in a single, vertical stack. This stack can then be transported to a new location near the oven by moving the pan truck on which the pans are stacked or by a conventional automatic storage and retrieval system. At the new location, a separate unstacker machine unstacks the stacked pans, one at a time. The unstacker machine picks up the top pan from the stack of pans and transports this pan onto a conveyor leading to the bakery processing system. As the pan moves through the bakery processing system, the material to be baked is introduced into the pan and the filed pan is moved to the oven for baking. When baking is completed, the baking pan is typically moved from the oven by a conveyor and another stacker machine removes the baking pans one at a time from the conveyor and stacks the pans in a single column.

These single stack stacker and unstacker machines have certain disadvantages. For example, these machines generally stack or unstack the baking pans in a single, vertical stack or column. Further, these machines must be preset by an operator for a particular pan size and must be reset if the pan size used in the baking process changes. Additionally, these known stacker and unstacker machines typically use a magnetic pick-up device to magnetically lift the top pan of the stack and transport it to its destination. These magnetic pick-up devices can damage the baking surface of the pan. Further, these magnetic pick-up devices are prone to picking up two or more pans, particularly if the adjacent upper pans happen to be stuck together. In addition, since only a single stack of pans is transported to or from a particular location, the stacker and unstacker machines must operate at a relatively high speed in order to continually move the necessary number of pans, one at a time, to or from the designated stack. This greatly increases the wear and tear on the stacker and unstacker machines.

Therefore, it is an object of the present invention to provide a device for stacking and unstacking a plurality of pans, each from a separate pan stack. It is a further object of the invention to provide a device which picks up the pans without damaging the baking surface of the pans and which easily adapts for use with a wide variety of pan sizes. It is also an object of the invention to provide a bakery processing system utilizing the stacking and unstacking device of the present invention to provide for smooth and efficient pan stacking, unstacking and transport in the bakery processing system.

SUMMARY OF THE INVENTION

A gripper assembly of the invention for a baking pan stacking and unstacking device includes a pick-up bar and at least one holding assembly carried on the pick-up bar. In one embodiment of the invention, the gripper assembly includes a first holding assembly having a first finger element pivotally mounted on the pick-up bar. A second holding assembly is provided having a second finger element pivotally mounted on the pick-up bar. A mechanical linkage is pivotally connected to the first and second finger elements such that pivotal movement of the first finger element causes pivotal movement of the second finger element. In another embodiment of the invention, the gripper assembly includes one pivotal holding assembly and one reciprocally movable holding assembly.

A complete understanding of the invention will be obtained from the following description when taken in connection with the accompanying drawing figures wherein like reference characters identify like parts throughout

BRIEF DESCRIPTION OF THE DRAWINGS

FIG. 1 is a side view of a first embodiment of a stacking and unstacking device according to the invention;

FIG. 2 is an end view of the device shown in FIG. 1;

FIG. 9 is a side view of an alternative embodiment of a stacking and unstacking device according to the invention;

FIG. 10 is an end view of the device shown in FIG. 9;

FIG. 11 is a side view of an alternative embodiment of a stacking and unstacking device according to the invention;

FIG. 12 is an end view of the device shown in FIG. 11;

DESCRIPTION OF THE PREFERRED EMBODIMENTS

Figure 3:
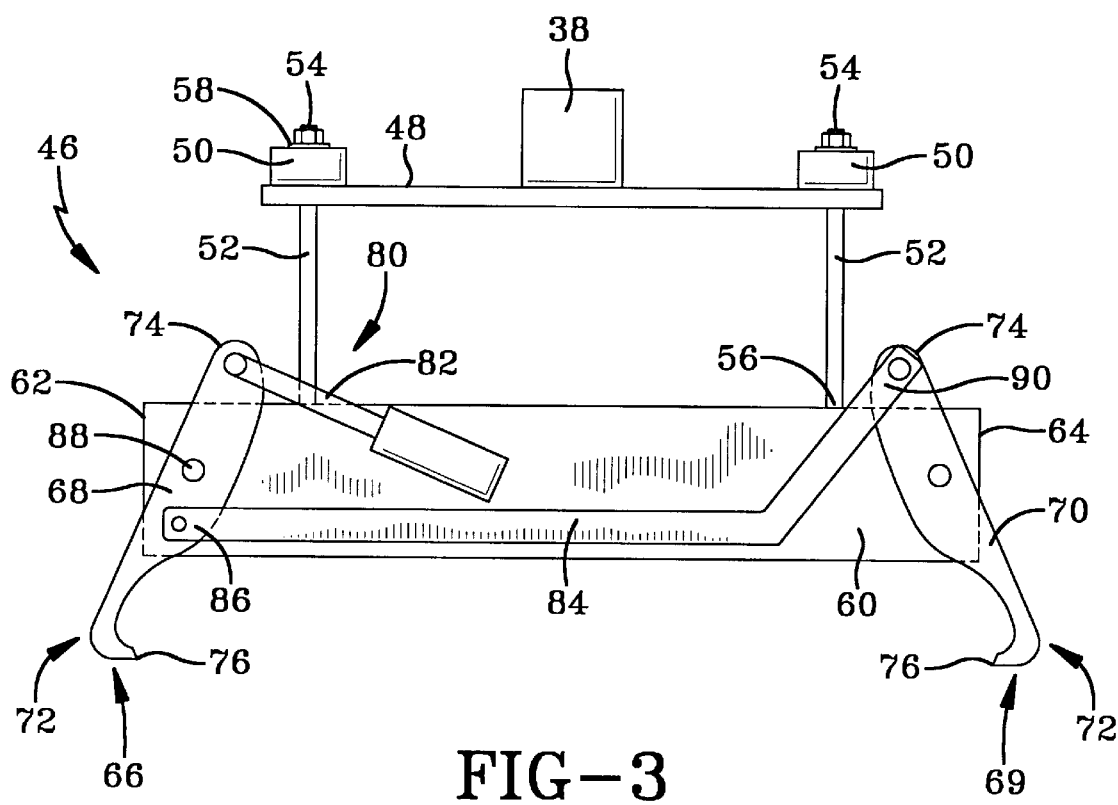
FIG. 3 is a side view of a first embodiment of a gripper assembly according to the invention.

For purposes of the description hereinafter, the terms "upper", "lower", "right", "left", "vertical", "horizontal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

A first embodiment of a stacking and unstacking device is generally designated 10 in FIGS. 1 and 2 of the drawings. The device 10 includes a substantially rectangular frame 12 having four or more substantially vertical posts 14 with a substantially horizontal beam 16 extending between each pair of opposed posts 14. A rail 18 extends along the upper surface of each beam 16. A pan lifting assembly 20 is carried on the beams 16 and is movable along the opposed rails 18. The pan lifting assembly 20 includes a lifter car 22 having a set of wheels 24 which are configured to travel over the opposed rails 18 of the frame 12. The lifter car 22 can be driven in conventional manner, such as by a frequency controlled motor. The lifter car 22 supports a vertically movable shaft 26 having a first end 30 and a second end 32. The shaft 26 is vertically movable in conventional manner, such as by a pneumatic cylinder system or a rack and pinion system.

A lifter bar assembly 36 is attached to the second end 32 of the shaft 26. The lifter bar assembly 36 includes a lifter bar 38 having a plurality of gripper assemblies 40 depending therefrom. A metal cage or fence 42 is located around the perimeter of the device 10. The fence 42 preferably has two doors which give access to the device 10.

The movement of the lifter car 22 along the rails 18 and the action of the vertical shaft 26 and gripper assemblies 40 are controlled by a control system. The control system can be a conventional computer control system connected to the device 10. Alternatively, the device 10 can be controlled in conventional manner by an operator using an input device, such as a keyboard.

The gripper assembly 40 of the invention can have various embodiments. A first embodiment of a gripper assembly of the invention is generally designated 46 in FIGS. 3 and 4 of the drawings. Each gripper assembly 46 includes a support plate 48 attached to the bottom of the lifter bar 38. A support block 50 is attached to each end of the support plate 48. Each support block 50 has a longitudinal bore through which slidably passes a support rod 52 having a first end 54 and a second end 56. A cap 58, such as a nut and washer arrangement, is attached to the first end 54 of each support rod 52 to prevent the support rod 52 from falling through the support block 50. A pick-up bar 60 is attached to the second ends 56 of the support rods 52.

The pick-up bar 60 is a substantially rectangular, metal bar having a first end 62 and a second end 64. As shown particularly in FIG. 3 of the drawings, a first holding assembly 66 is located near the first end 62 of the pick-up bar 60. The first holding assembly 66 includes a first claw or finger element 68 pivotally mounted adjacent the first end 62 of the pick-up bar 60. A second holding assembly 69 is positioned adjacent the second end 64 of the pick-up bar 60 and includes a pivotally mounted second finger element 70. Each finger element 68 and 70 has a first end 72 and a second end 74, with the first ends 72 being substantially L-shaped and having a wedge-shaped tip 76.

A pneumatic piston assembly 80 is attached to the pick-up bar 60 with the piston rod 82 of the pneumatic piston assembly 80 pivotally connected to the second end 74 of the first finger element 68. A mechanical linkage 84 extends between, and is pivotally connected to, the two finger elements 68 and 70. A first end 86 of the mechanical linkage 84 is pivotally attached to the first finger element 68 between a pivot point 88 and the tip 76 of the first finger element 68.

The second end 90 of the mechanical linkage 84 is pivotally attached to the second end 74 of the second finger element 70. The finger elements 68 and 70 are mounted on the pick-up bar 60 such that the wedge-shaped tips 76 of the respective finger elements 68 and 70 face inwardly.

Figure 4:
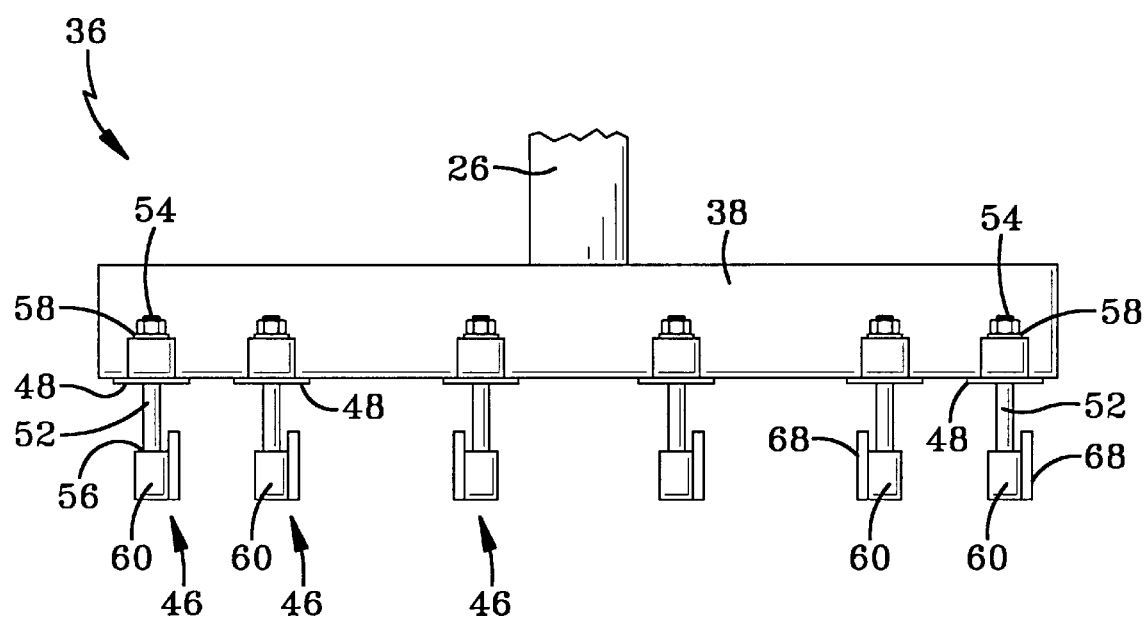
FIG. 4 is an end view of a lifter bar assembly having a plurality of the gripper assemblies of FIG. 3.

As shown in FIG. 4 of the drawings, a plurality of gripper assemblies 46 are spaced along the bottom of the lifter bar 38. A pneumatic source may be mounted on top of the lifter bar 38 and may be connected in conventional manner, such as through flexible hoses, to the individual pneumatic piston assemblies 80 of the various gripper assemblies 46. The pneumatic source is preferably attached to, and is part of, the control system for the device 10.

Alternatively, a second embodiment of a gripper assembly may be carried on the lifter bar 38 in lieu of the gripper assembly 46 described above. A second embodiment of a gripper assembly of the invention is generally designated 96 in FIGS. 5–8 of the drawings. As shown particularly in FIGS. 5 and 6, the gripper assembly 96 includes a support plate 98 attached to the bottom of the lifter bar 38. A pair of support blocks 50' are mounted on the opposed ends of the support plate 98 and support rods 52' are slidably mounted in the support blocks 50' in similar manner to the gripper assembly 46 discussed above.

A pick-up bar 60' is attached to the second ends 56' of the support rods 52'. The pick-up bar 60' includes a longitudinal axis Y. A pivoting first holding assembly 100 is mounted near one end of the pick-up bar 60' and a reciprocating or telescoping second holding assembly 102 is also mounted on the pick-up bar 60'. The first holding assembly 100 includes a finger element 104, similar to the finger elements 68 and 70 described above. The finger element 104 is pivotally mounted near one end of the pick-up bar 60'. The finger element 104 has a first end 106 and a second end 108. The first end 106 includes a wedge-shaped tip 110. The first holding assembly 100 further includes a first pneumatic piston assembly 112 attached to the pick-up bar 60', with the piston rod 114 of the first piston assembly 112 attached to the second end 108 of the finger element 104.

Figure 8:
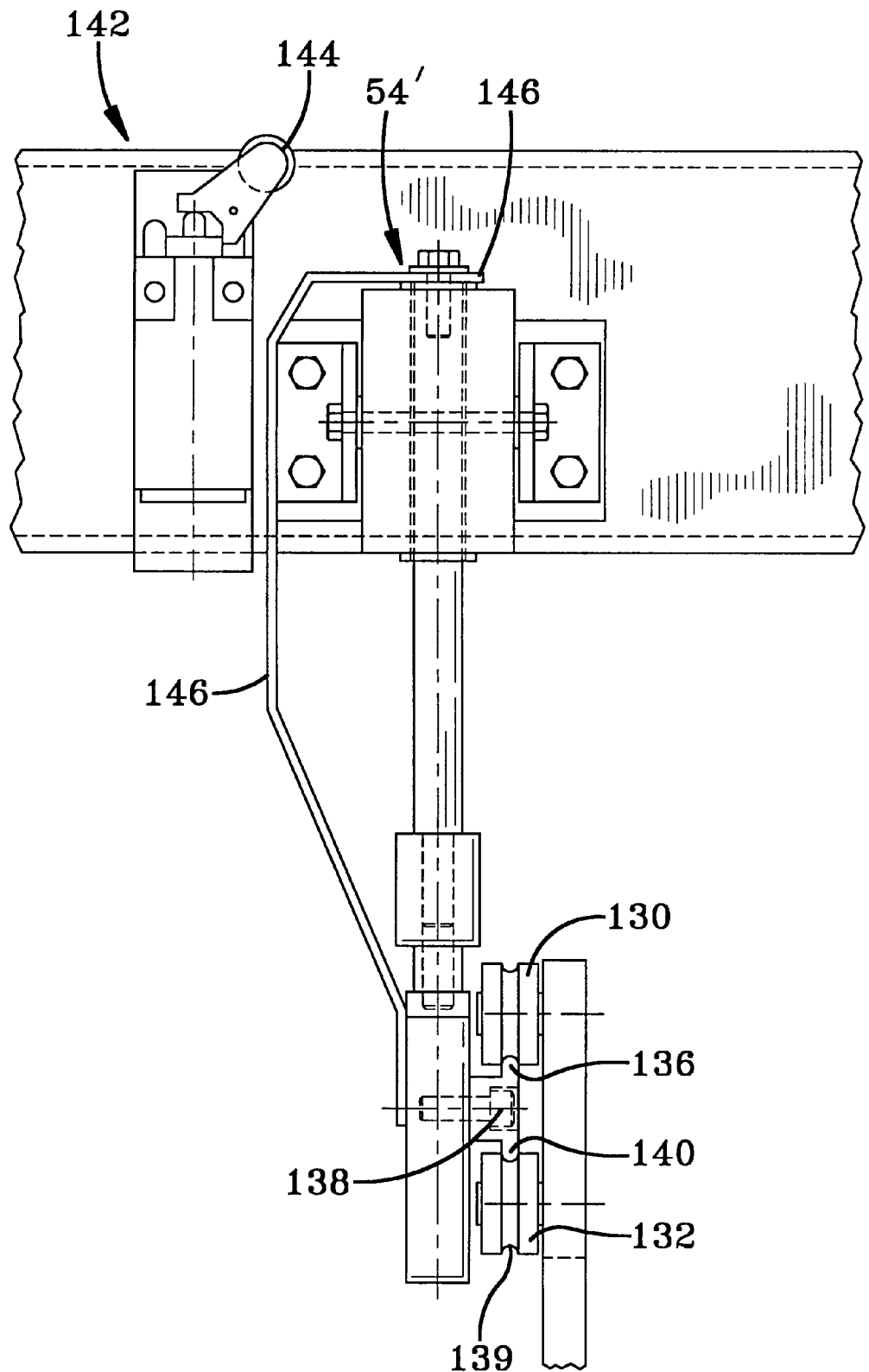
FIG. 8 is an end view of the gripper assembly shown in FIG. 5 as seen in direction L.

The second holding assembly 102 includes a second pneumatic piston assembly 116 mounted on the pick-up bar 60'. The piston rod 118 of the second piston assembly 116 is attached to a holding element 120 having a substantially rectangular body 122 with a gripping and separating element 124 depending therefrom. The piston rod 118 is substantially parallel to the longitudinal axis of Y of the pick-up bar 60'. The gripping and separating element 124 has a wedge-shaped tip 126 similar to that of the finger element 104. Two upper wheels 130 and one lower wheel 132 are rotatably mounted on the holding element 120. As shown particularly in FIG. 6, the upper wheels 130 have a central groove 134 which engages an upper or first projection 136 extending from a track 138 mounted on the pick-up bar 60'. As shown in FIG. 8, the lower wheel 132 also includes a groove 139 configured to engage a lower or second projection 140 extending from the track 138. As shown particularly in FIG. 5, the gripping and separating element 124 is movable from an extended position, as shown in solid lines, to a retracted position, as shown in dashed lines.

Figure 5:
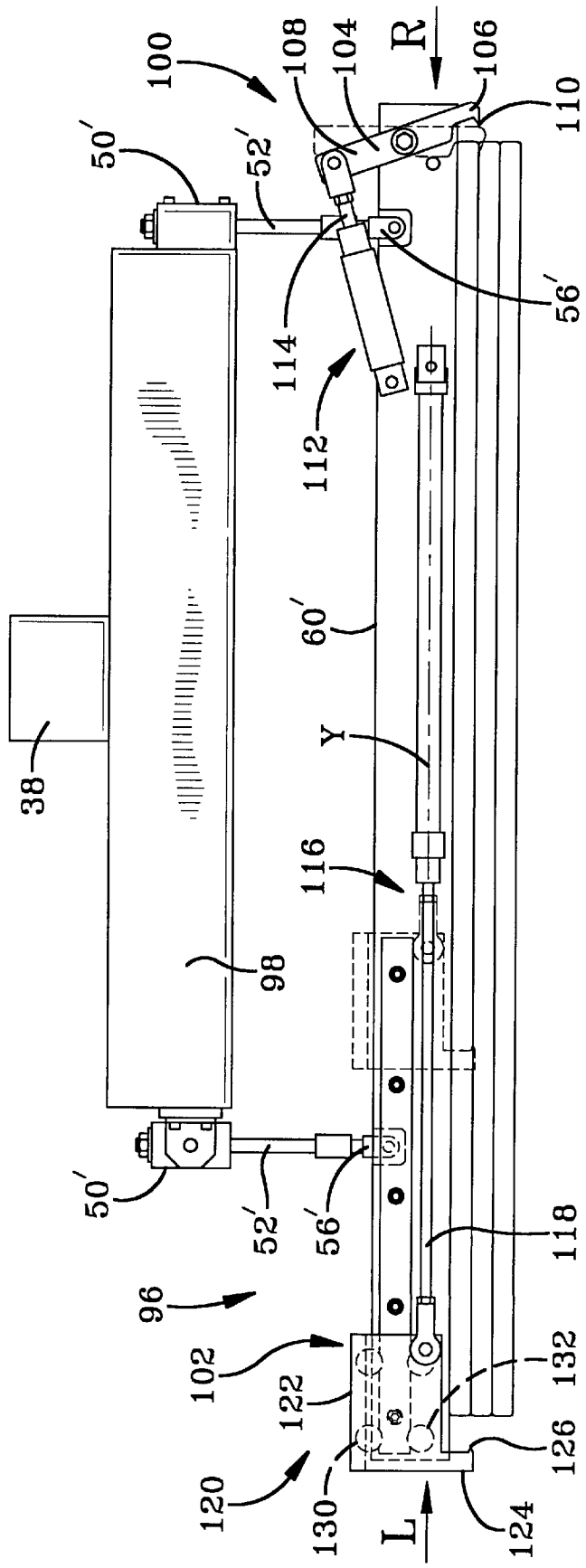
FIG. 5 is a side view of an alternative embodiment of a gripper assembly according to the invention.
Figure 6:
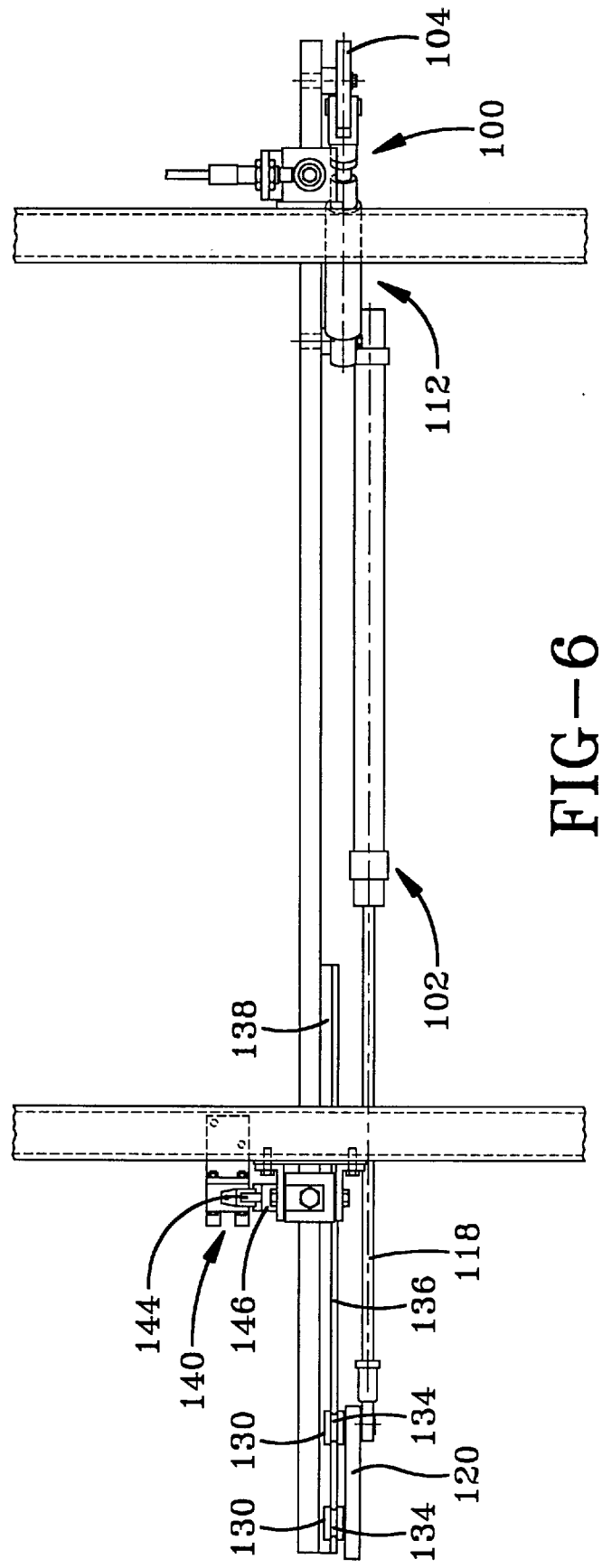
FIG. 6 is a plan view of the gripper assembly shown in FIG. 5.
Figure 7:
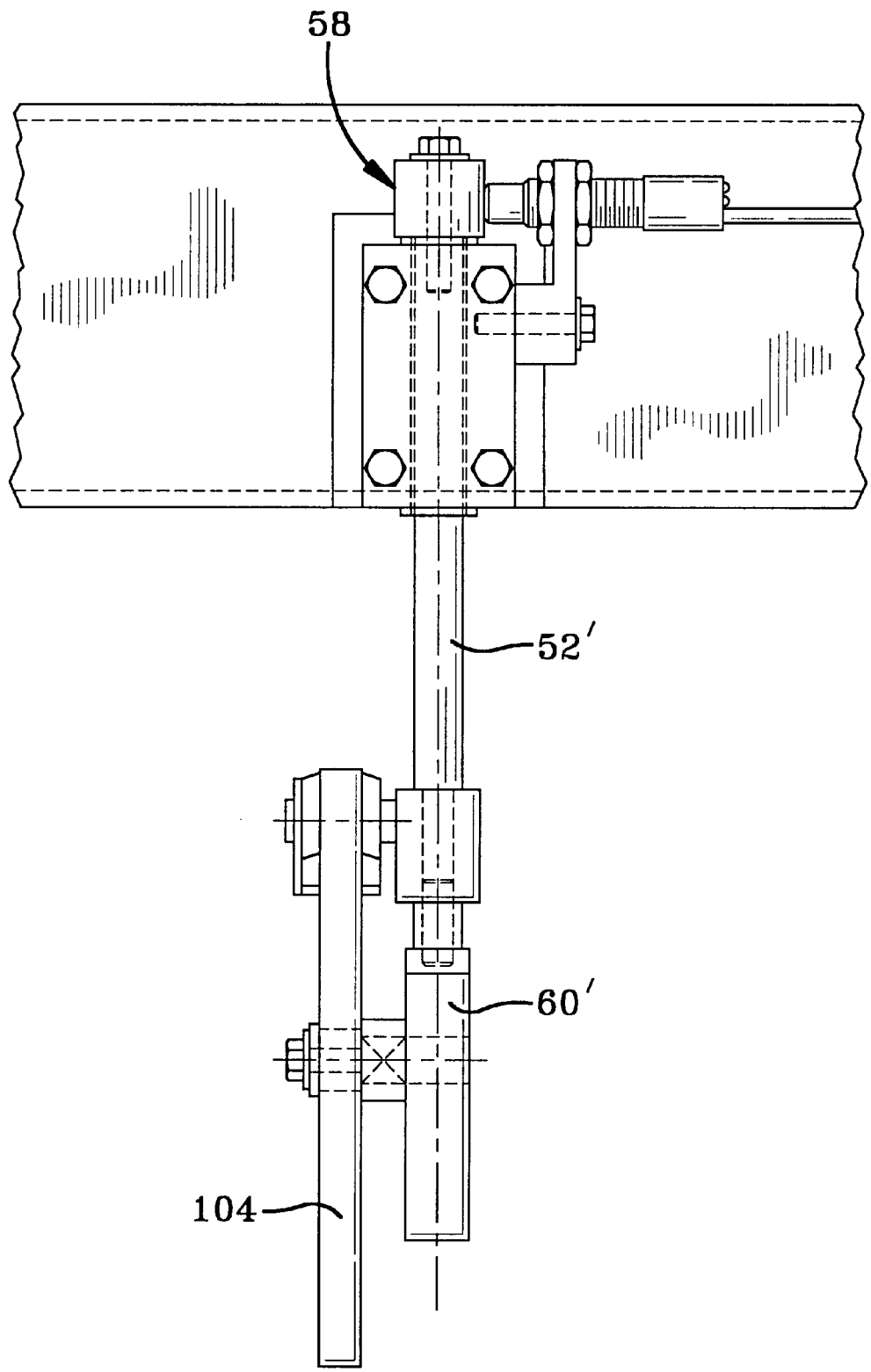
FIG. 7 is an end view of the gripper assembly shown in FIG. 5 as seen in direction R.

As shown in FIGS. 6 and 8 of the drawings, a limit switch assembly 142 is mounted adjacent to the support rod 52' shown on the left side of FIG. 5. The limit switch assembly 142 includes a conventional, pivotable limit switch 144. As shown particularly in FIG. 8, a first end 146 of a metal shield 148 is attached to the first end 54' of the support rod 52' and a second end 150 of the shield 148 is attached to the pick-up bar 60'. The operation of the limit switch assembly 142 is described hereinbelow.

A second embodiment of a stacking and unstacking device is generally designated 154 in FIGS. 9 and 10 of the drawings. The device 154 includes a frame 156 formed by an upper support beam 158 and a lower support beam 160 mounted on a series of vertical posts 162. A vertical support member 164 is mounted on the upper and lower beams 158 and 160 and is movable along the lengths of the beams 158 and 160 in conventional manner, such as by a chain drive or a wheel and track drive. A pan lifting assembly 166 is mounted on the vertical support member 164. The lifting assembly 166 includes a first motor 168 to move the vertical support member 164 along the beams 158 and 160. The lifting assembly 166 also includes a lifter bar assembly 170 having a lifter bar 172 movably mounted on the vertical support member 164 and movable along the length of the vertical support member 164 in conventional manner, such as by a second motor 174 connected to a conventional chain drive unit. A plurality of gripper assemblies 176, such as gripper assemblies 46 or 96 discussed hereinabove, are spaced along the bottom of the lifter bar 172.

A third embodiment of the stacking and unstacking device is generally designated 180 in FIGS. 11 and 12 of the drawings. The device 180 includes a frame 182 formed by two spaced-apart rows of stanchions 184 having a beam 186 located on top of each row of stanchions 184. A rail 187 is located on top of each beam 186 and a pan lifting assembly 188 is movable along the tops of the rails 187 in conventional manner, such as by a rack and pinion or a chain drive. The lifting assembly 188 includes a pair of pivotable, spaced-apart arms 190 having a lifter bar assembly 192 supported between the arms 190. A motor 194 is provided to move the lifting assembly 188 along the tops of the beams 186 and another motor 196 is provided to pivot the arms 190, and hence the lifter bar assembly 192, up and down. A plurality of gripper assemblies 198, such as gripper assemblies 46 or 96 discussed hereinabove, are spaced along the lifter bar assembly 192.

Figure 13:
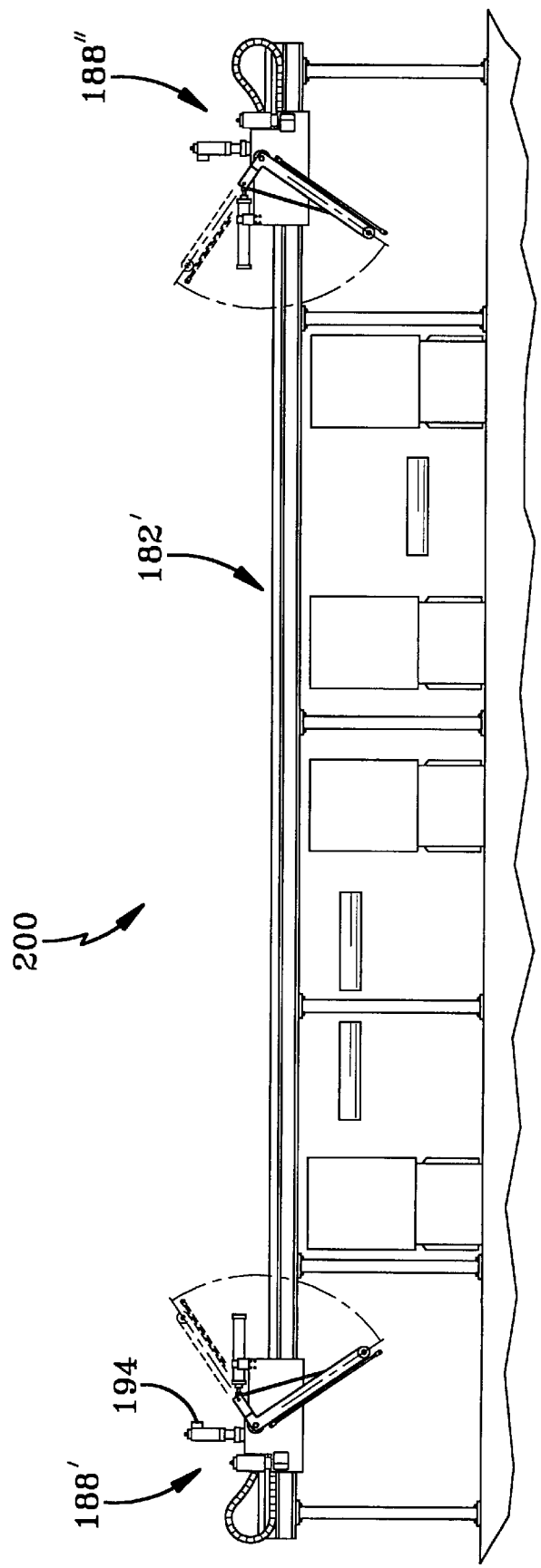
FIG. 13 is a side view of an alternative embodiment of a stacking and unstacking device according to the invention.
Figure 14:
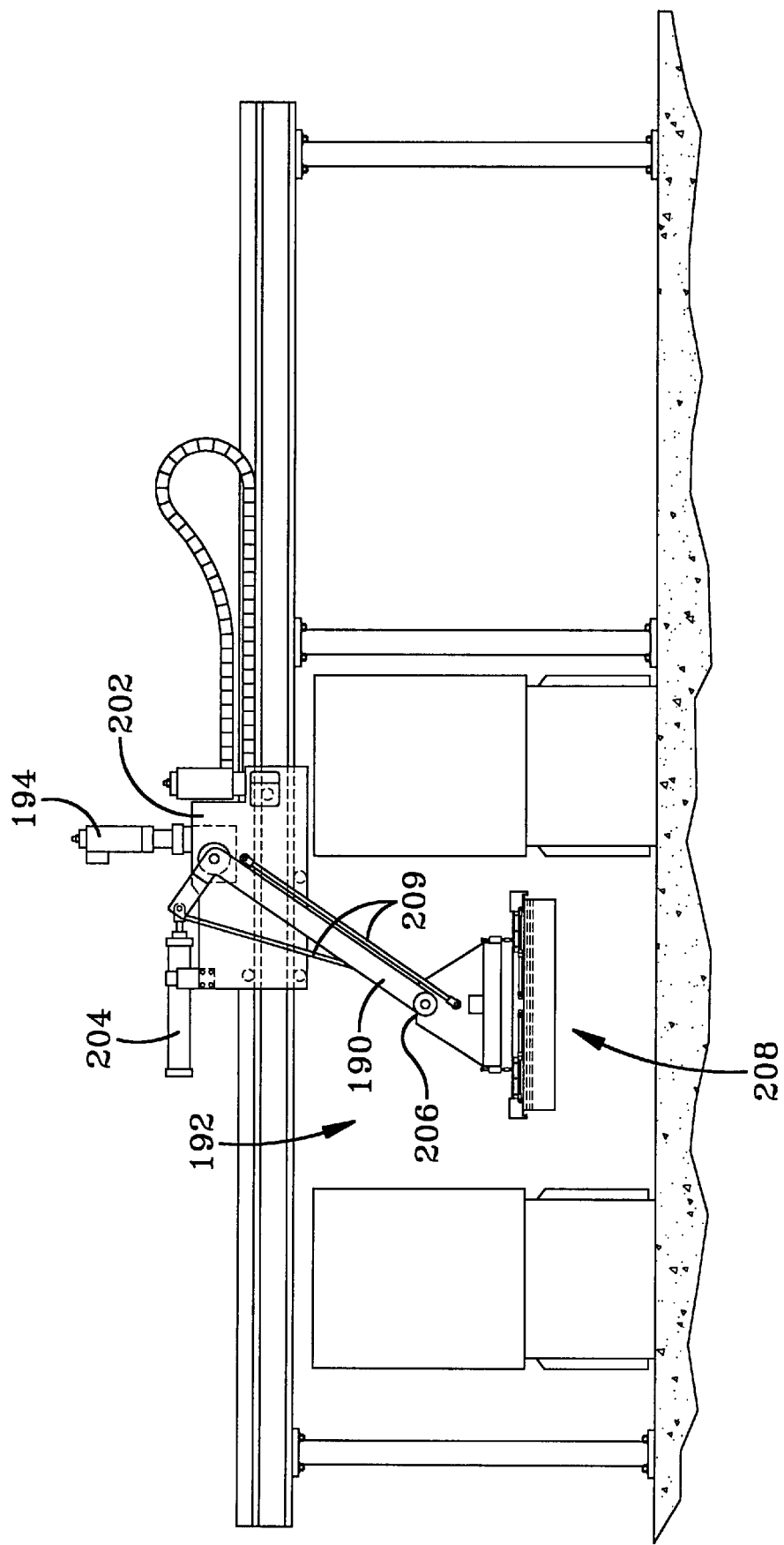
FIG. 14 is a more detailed view of the right end of the device shown in FIG. 13.
Figure 15:
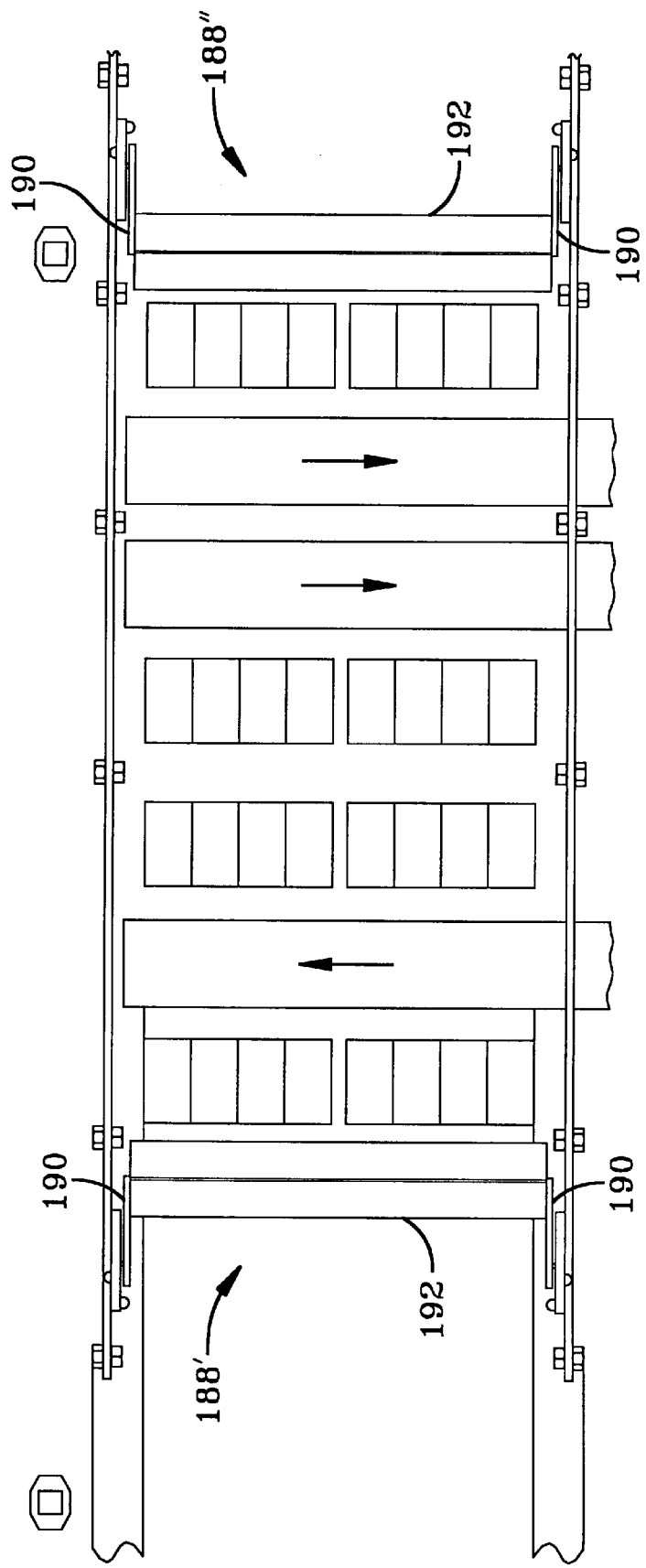
FIG. 15 is a plan view of the device shown in FIG. 13.

A fourth embodiment of a stacking and unstacking device is generally designated 200 in FIGS. 13–15 of the drawings. The device 200 is similar to the device 180 shown in FIGS. 11 and 12 of the drawings but includes movable pan lifting assemblies 188' and 188" located at both ends of the frame 182'. As shown in FIG. 14, the lifting assemblies 188, 188' and 188" include a movable lifter car 202 propelled by the motor 194. The lifter bar assembly 192 is pivotally mounted on the lifter car 202. The lifter bar assembly 192 includes a pair of spaced-apart, substantially L-shaped arms 190 pivotally mounted to the lifter car 202. A pair of piston assemblies 204 are mounted on the lifter car 202, with the piston rod of each piston assembly 204 attached to one end of the arm 190. The lifter bar assembly 192 is mounted between the opposed arms 190 and is pivotally attached to the outer or second ends 206 of the arms 190. The lifter bar assembly 192 includes a plurality of gripping assemblies 208, such as the gripper assemblies 46 and 96 discussed above, depending therefrom. Stabilizing bars 209 are used to make sure that the lifting bar assembly 192 remains horizontal when moving the arms 190 up and down.

Figure 16:
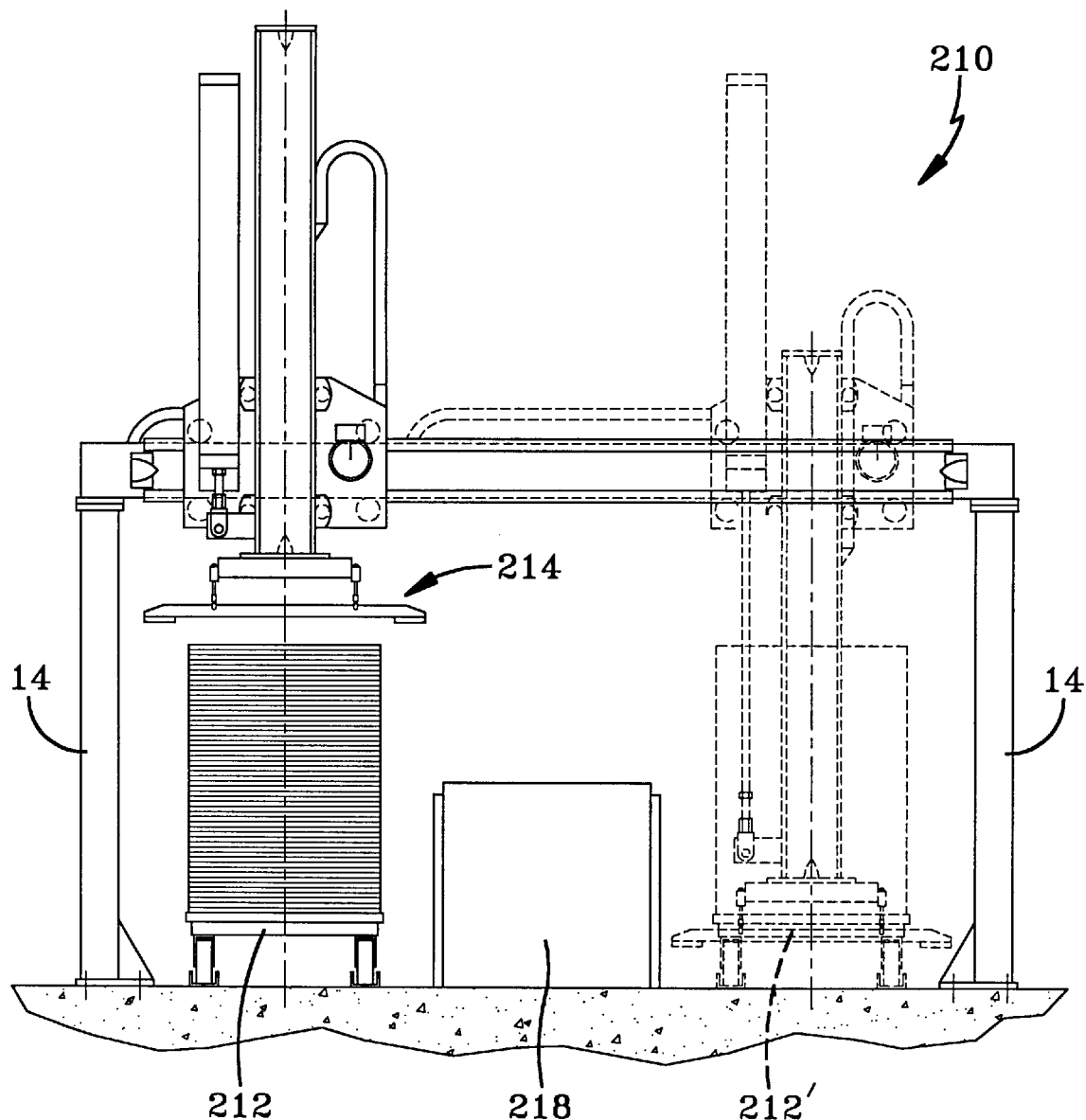
FIG. 16 is a side view of a device particularly suited to stack and unstack pans onto or off of a pan truck.
Figure 17:
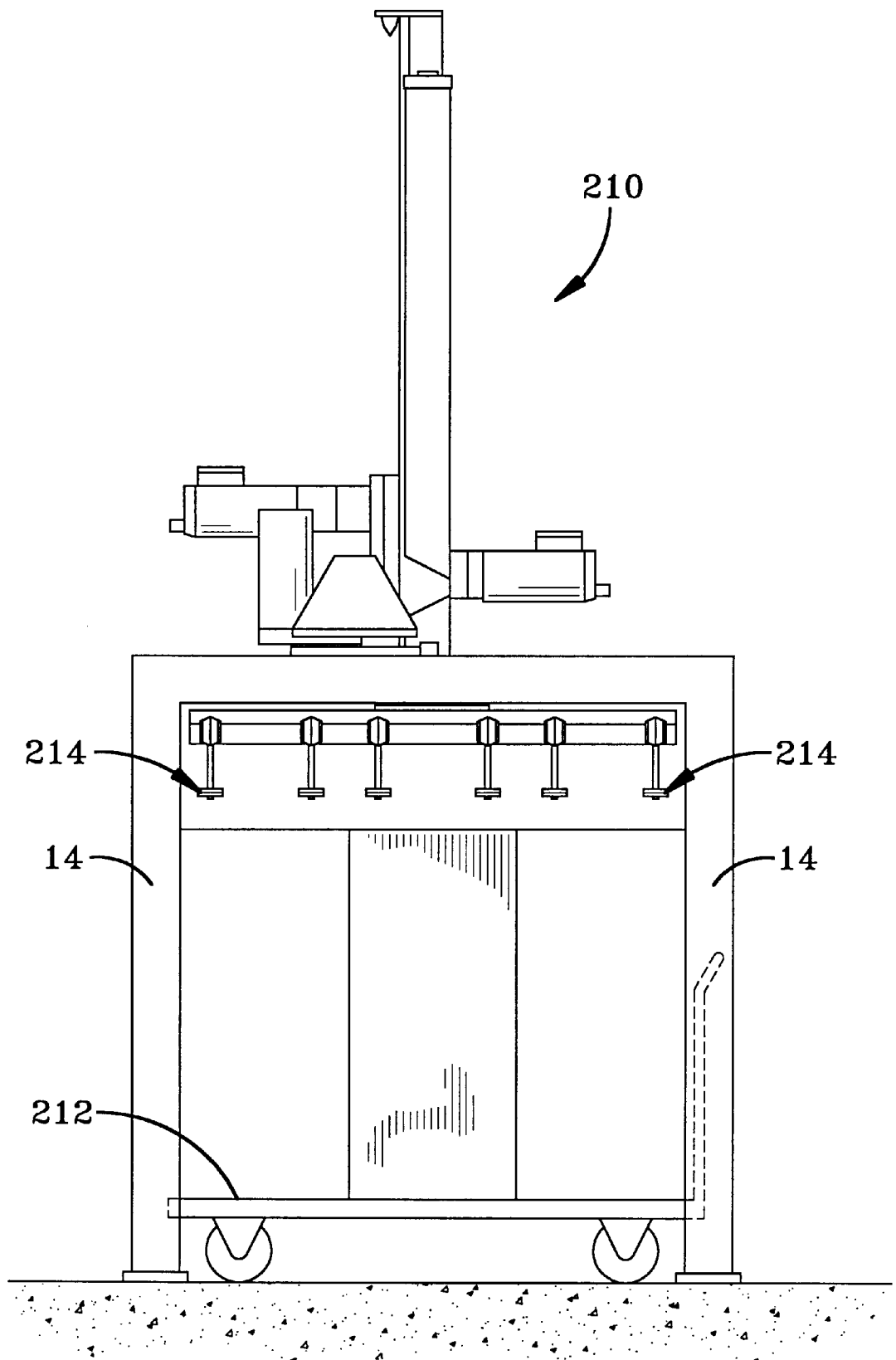
FIG. 17 is an end view of the device shown in FIG. 16.
Figure 18:
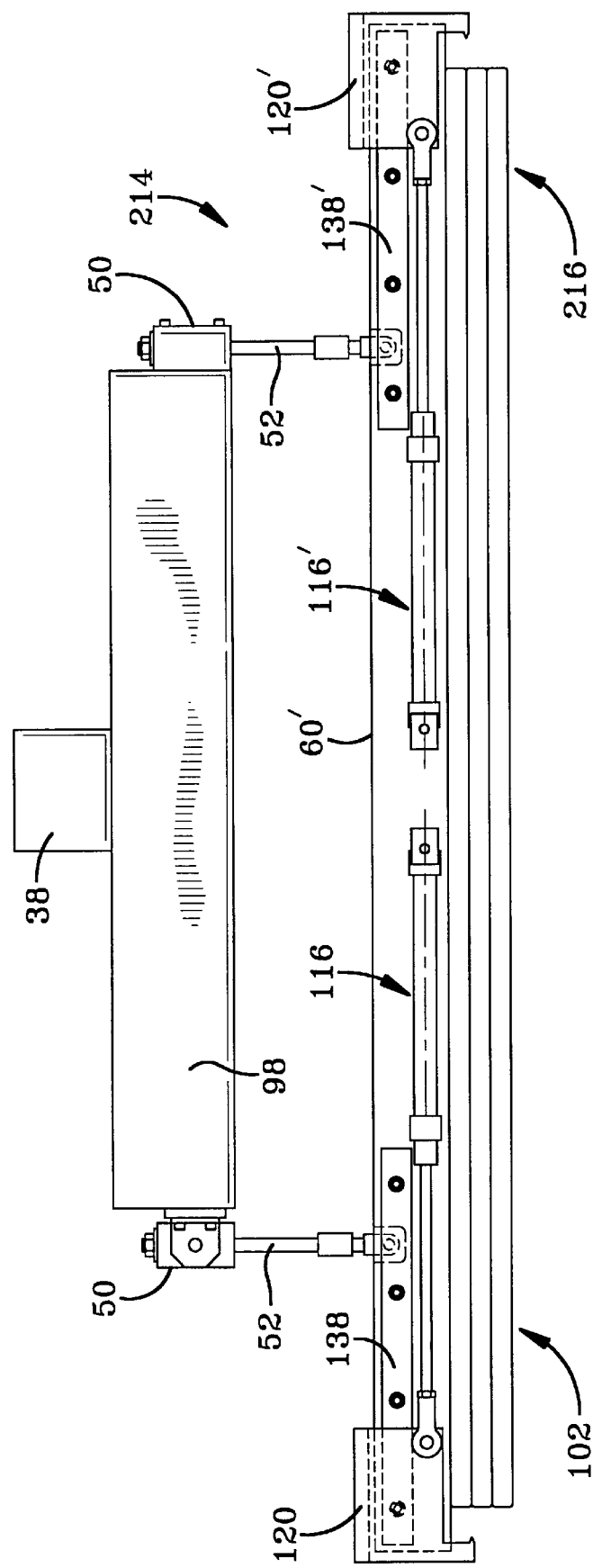
FIG. 18 is a side view of a modified gripper assembly of the invention.

A fifth embodiment of a stacking and unstacking device is generally designated 210 in FIGS. 16 and 17 of the drawings. The device 210 is similar to the device 10 shown in FIGS. 1 and 2 of the drawings but the vertical posts 14 are spaced closer together so that one or more pan trucks 212 can be positioned between the posts 14. Further, the device 210 includes a modified gripper assembly 214. As shown in FIG. 18 of the drawings, the modified gripper assembly 214 is similar to the gripper assembly 96 shown in FIGS. 5 and 6 of the drawings except that the first holding assembly 100 is replaced by another reciprocating holding assembly 216 similar to the reciprocating holding assembly 102 shown in FIGS. 5 and 6 of the drawings. The pan truck 212 may be placed adjacent a pan conveyor 218 to reduce the travel required for the device 210 to remove pans from the pan truck 212 and place them on the conveyor 218 and to remove pans from the conveyor and place them on an empty pan truck 212' (as shown in dashed lines in FIG. 16).

Operation of the various stacking and unstacking devices and the gripper assemblies will now be described. Looking first at the device 10 shown in FIGS. 1 and 2 of the drawings, rows of pans are stacked on the floor or on pan trucks near the device 10. Because of the length of the lifter bar assembly 36, several stacks of pans can be positioned adjacent to each other so that the top pan from each stack is removed at the same time. The pan lifting assembly 20 is moved along the rails 18 so that the lifter bar 38 is positioned over the stacked rows of pans to be moved. The shaft 26 is moved downwardly under the control of an operator or a computer program until the gripper assemblies 40 are positioned adjacent the upper row of pans.

Assuming the gripper assemblies 40 are the first embodiment gripper assembly 46 shown in FIGS. 3 and 4 of the drawings, when the gripper assemblies 46 are in position, the pneumatic piston assembly 80 is energized causing the piston rod 82 to move outwardly from the piston assembly 80. As the piston rod 82 moves outwardly, it causes the second end 74 of the first finger element 68 to pivot, thus forcing the first end 72 of the first finger element 68 with the wedge-shaped tip 76 to move inwardly toward one side of the pan. As the first finger element 68 pivots, the mechanical linkage 84 causes the second finger element 70 to pivot, thus forcing the first end 72 of the second finger element 70 to pivot inwardly. The piston rod 82 is extended until the tips 76 of the first and second finger elements 68 and 70 contact the opposed sides of the pan.

The gripper assemblies 46 are preferably spaced along the length of the lifter bar 38 such that each pan is gripped by at least two gripper assemblies 46. The wedge-shaped tips 76 are configured to slip between adjacent stacked pans to help separate the pans if the pans are stuck together. When the lifter bar 38 is raised, the top pan from each of the stacks is lifted. The lifter car 22 is then traversed along the rails 18 to a position above a conveyor leading to the bakery processing system. The lifter bar 38 is lowered until the pans are on the conveyor and then the pneumatic piston assembly 80 is de-energized, pivoting the first ends 72 of the first and second finger elements 68 and 70 outwardly and thus releasing the pans on the conveyor. In a similar manner, used pans coming from the bakery processing system on conveyors can be picked up and moved to another or the same location depending on what type of pans are on the system and stacked in rows by the device 10.

Alternatively, if the second embodiment of the gripper assembly 96 is used, the transport steps described above are the same. However, the lifting step is slightly modified. The lifter bar 38 is lowered until the gripper assembly 96 is positioned on the top pan of the rows of stacked pans. The first pneumatic piston assembly 112 is activated causing the piston rod 114 to move out of the cylinder. As the piston rod 114 moves outwardly, it causes the finger element 104 to pivot, thus forcing the wedge-shaped tip 110 of the finger element 104 toward the pan. The second pneumatic piston assembly 116 is energized causing the piston rod 118 to move into the cylinder. As the piston rod 118 moves into the cylinder, the holding element 120 travels along the track 138 until the gripping and separating element 124 engages the opposite end of the tray. In addition to gripping the pan, the wedge-shaped tip 126 also helps separate the top pan from the lower adjacent pan. The length of travel of the holding element 120 can either be controlled by an operator or programmed into the computer control system. Alternatively, a conventional resistance sensor can be employed so that the inward telescoping of the piston rod 118 is stopped when a predetermined amount of resistance is detected. After the top pans are thus gripped by the gripper assemblies 96, the lifter bar 38 is raised and the pans transported to the new location. To release the pans, the first pneumatic piston assembly 112 is de-energized, causing the piston rod 114 to move into the cylinder thus rotating the first end 106 of the finger element 104 outwardly. The second piston assembly 116 is energized to move the piston rod 118 outwardly to cause the separating element 124 to move outwardly away from the pan.

If the modified gripper assembly 214 shown in FIG. 18 is used, the lifter bar 38 is positioned above the pans as previously described and then each piston assembly 116 and 116' is activated as required to reciprocally move the holding elements 120 and 120' inwardly and outwardly as required to grip or release pans.

With respect to the limit switch assembly 142 shown in FIG. 8 of the drawings, if due to operator or computer error the lifter bar 38 moves too far down on top of the pan stacks, the support rod 52' is pushed upwardly through the support block 50'. The shield 148 moves upwardly until the top of the shield 148 contacts the limit switch 144, tripping the limit switch 144 and causing the descent of the lifter bar 38 to stop and signaling that an error has occurred in the system.

Operation of the device 154 shown in FIGS. 9 and 10 of the drawings is as follows, the vertical support member 164 is moved along the beams 158 and 160 until the lifter bar assembly 170 is over the rows of pans to be moved. The lifter bar assembly 170 is then moved downwardly until the gripper assemblies 176 are in position above the top row of pans. The gripper assemblies 176 grip the top row of pans in similar manner as described above and then the lifter bar assembly 170 is moved vertically to lift the top row of pans from the adjacent stacks. The lifter bar assembly 170 is then moved along the beams 158 and 160 to the new location where the pans are released from the gripper assemblies 176 as described above.

In the device 180 shown in FIGS. 11 and 12 of the drawings, the pan lifting assembly 188 is moved along the opposed beams 186 until the lifter bar assembly 192 is positioned over the row of pans to be moved. The opposed arms 190 are pivoted so that the lifter bar assembly 192 moves downwardly to allow the gripper assemblies 198 to grip the top row of pans in similar manner as described above. The arms 190 are then pivoted again to move the lifter bar assembly 192 upwardly to lift the top row of pans. The pan lifting assembly 188 is then moved along the beams 186 to the new location and the arms 190 are pivoted downwardly to place the pans at the new location and then the gripper assemblies 198 are disengaged to release the pans. The device 180 is particularly well adapted for moving wide pan loads.

The device 180 shown in FIGS. 13–15 of the drawings operates in similar manner to the device 180 shown in FIGS. 11 and 12 of the drawings except that pan lifting assemblies 188' and 188" are located at each end of the frame 182. The two pan lifting assemblies 188' and 188" can therefore be used in tandem to move rows of stacked trays onto and off of adjacent conveyors.

The stacking and unstacking devices of the invention are usually used to stack and unstack baking pans which are stored in rows on the bakery floor. The positions of different sizes of baking pans are stored in the control system of the device. However, as shown in FIGS. 16 and 17 of the drawings, the stacking and unstacking device 210 can also be used to transport a row of baking pans from a portable pan truck or a number of portable pan trucks onto a pan conveyor of the bakery system. Alternatively, the stacking and unstacking device 210 can also be used to remove pans from the conveyor and place them on portable pan trucks. This cuts down on the floor space required in the area of the stacking and unstacking device since, instead of having a number of stacked rows of baking pans on the bakery floor, rows of baking pans can be wheeled into or out of the area of the stacking and unstacking device 210 on portable pan trucks 212, as needed. Operation of the device 210 is similar to that described above with respect to the device 10 shown in FIGS. 1 and 2 of the drawings.

While preferred embodiments of the invention have been described in detail herein, it will be appreciated by those skilled in the art that various modifications and alternatives to the preferred embodiments may be developed in light of the overall teaching of the disclosure. For example, the gripper assemblies 46 and 96 and modified gripper assembly 214 can be used with any of the stacking and unstacking devices. Additionally, while a piston assembly is preferably used in the reciprocating holding assembly, other reciprocally movable devices, such as rack and pinion devices, could also be used. Accordingly, the particular arrangements are illustrative only and are not limiting as to the scope of the invention which is to be given the full breadth of the appended claims and any and all equivalents thereof.

I claim:

1. A gripper assembly for a baking pan stacking and unstacking device, comprising:
    a pick up bar;
    a first holding assembly carried on said pick-up bar, wherein said first holding assembly includes a reciprocating holding assembly having a reciprocally movable holding element;
    a second holding assembly having a pivotally movable holding element; and
    wherein each holding element includes a gripping and separating element that is substantially L-shaped having a substantially inwardly-facing wedge-shaped tip.

2. The gripper assembly as claimed in claim 1, wherein said pick-up bar includes a longitudinal axis and a track mounted on said pick up bar parallel to said longitudinal axis of said bar; and
    a piston assembly with a piston rod attached to said first holding assembly, said piston rod reciprocally movable parallel to said longitudinal axis of said pick-up bar, with said reciprocally movable holding element configured to ride along said mounted track.

3. The gripper assembly as claimed in claim 2, wherein said track has a first projection and a second projection, said holding element has a first wheel and a second wheel, with said first wheel having a central groove engaging said first projection and said second wheel having a central groove engaging said second projection.

4. The gripper assembly as claimed in claim 3, wherein said pick-up bar is mounted on at least one support rod slidably carried on a lifter bar.

5. The gripper assembly as claimed in claim 4, including a limit switch assembly located adjacent said at least one support rod and a shield attached to said support rod, wherein said limit switch assembly and said at least one support rod are configured such that when said support rod moves beyond a predetermined position, said shield engages a limit switch of said limit switch assembly to stop further movement of said lifter bar.

6. A gripper assembly for a baking pan stacking and unstacking device, comprising:

a pick up bar;

a first holding assembly carried on said pick-up bar having a reciprocally movable holding element;

a second holding assembly having a pivotally movable holding element wherein said second holding assembly includes a finger element pivotally mounted on said pick-up bar, said finger element having a first end that is substantially L-shaped, having a substantially wedge-shaped tip inwardly facing said first holding assembly, and a second end; and a piston assembly mounted on said pick-up bar having a piston rod, said piston rod attached to said second end of said finger element, the motion of said piston rod causing said finger element to pivot.

7. The gripper assembly as claimed in claim 6, wherein said pick-up bar is mounted on at least one support rod slidably carried on a lifter bar.

8. A gripper assembly for a baking pan stacking and unstacking device, comprising:

a pick up bar;

a piston assembly having a movable piston rod, the piston assembly mounted on said pick up bar;

a first holding assembly carried on said pick-up bar having a reciprocally movable holding element;

a second holding assembly having a pivotally movable holding element wherein said second holding assembly includes a finger element pivotally mounted on said pick-up bar, said finger element having a first end that includes a substantially wedge-shaped tip and a second end attached to said piston rod, the motion of the piston rod causing said finger element to pivot;

at least one support rod and a shield attached to said support rod; and a limit switch assembly located adjacent said at least one support rod and said shield, wherein said limit switch assembly and said at least one support rod are configured such that when said support rod moves beyond a predetermined position, said shield engages a limit switch of said limit switch assembly to prevent further movement of said lifter bar.

9. A gripper assembly for a baking pan stacking and unstacking device, comprising:

a gripper assembly for a baking pan stacking and unstacking device, comprising:

pick-up bar, wherein said pick-up is mounted on at least one support rod slidably carried on a lifter bar;

a pivoting holding assembly mounted adjacent a first end of said pick-up bar, said pivoting holding assembly including a finger element pivotally mounted adjacent said first end of said pick-up bar and a first piston assembly mounted on said pick-up bar, with a piston rod of said first piston assembly connected to said finger element;

a reciprocating holding assembly carried on said pick-up bar, wherein said reciprocating holding assembly includes a second piston assembly mounted on said pick-up bar with a piston rod of said second piston assembly reciprocally movable substantially parallel to a longitudinal axis of said pick-up bar and a holding element attached to said piston bar of said second piston assembly;

a track mounted on said pick-up bar, with said holding element configured to ride along said track;

a limit switch assembly located adjacent said at least one support rod; and a shield mounted on said at least one support rod, wherein said limit switch assembly and said at least one support rod are configured such that when said support rod moves beyond a predetermined position, said shield engages a limit switch of said limit switch assembly to stop further movement of said lifter bar.

\* \* \* \* \*